United States Patent [19]

Osmond

[11] Patent Number: 5,661,855
[45] Date of Patent: Sep. 2, 1997

[54] RESERVOIR FILL VALVE CONTROL FOR TOILET STORAGE TANKS

[76] Inventor: John S. Osmond, 2525 14th St., Santa Monica, Calif. 90405

[21] Appl. No.: 526,381

[22] Filed: Sep. 11, 1995

[51] Int. Cl.[6] .................................................. E03D 1/00
[52] U.S. Cl. ........................ 4/415; 137/135; 137/393; 137/428
[58] Field of Search .................... 4/415; 137/135, 137/393, 428

[56] References Cited

U.S. PATENT DOCUMENTS

| | | | |
|---|---|---|---|
| 4,471,798 | 9/1984 | Johannesen | 137/393 X |
| 4,993,086 | 2/1991 | Palmer | 4/415 X |
| 5,109,552 | 5/1992 | Osmond | 4/368 |
| 5,228,145 | 7/1993 | Osmond | 4/370 |
| 5,301,375 | 4/1994 | Osmond | 4/368 |
| 5,464,037 | 11/1995 | Younes | 4/415 X |

*Primary Examiner*—Charles E. Phillips
*Attorney, Agent, or Firm*—William H. Maxwell

[57] ABSTRACT

A fill valve control system for toilet storage tanks, for preventing continued flow from a water supply thereto as a result of a flush valve leak or a tank leak, wherein the fill valve is responsive to a water level in a separate reservoir filled by a full level of storage tank water to shut OFF said fill valve, there being a syphon from the reservoir and responsive to flushing water from the storage tank to empty said reservoir to turn ON said fill valve, there being a flood prevention means that refills the reservoir in the event of a system failure, and there being a restart means to empty the reservoir for initiating normal operation of the system.

16 Claims, 6 Drawing Sheets

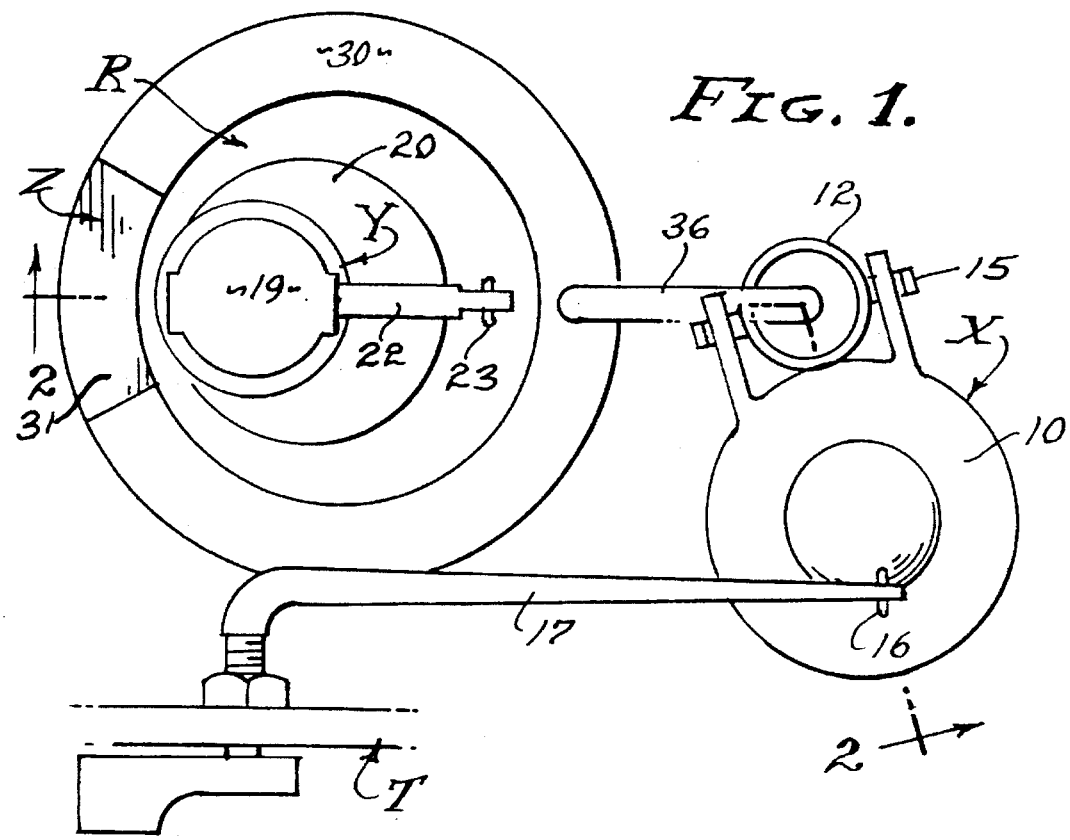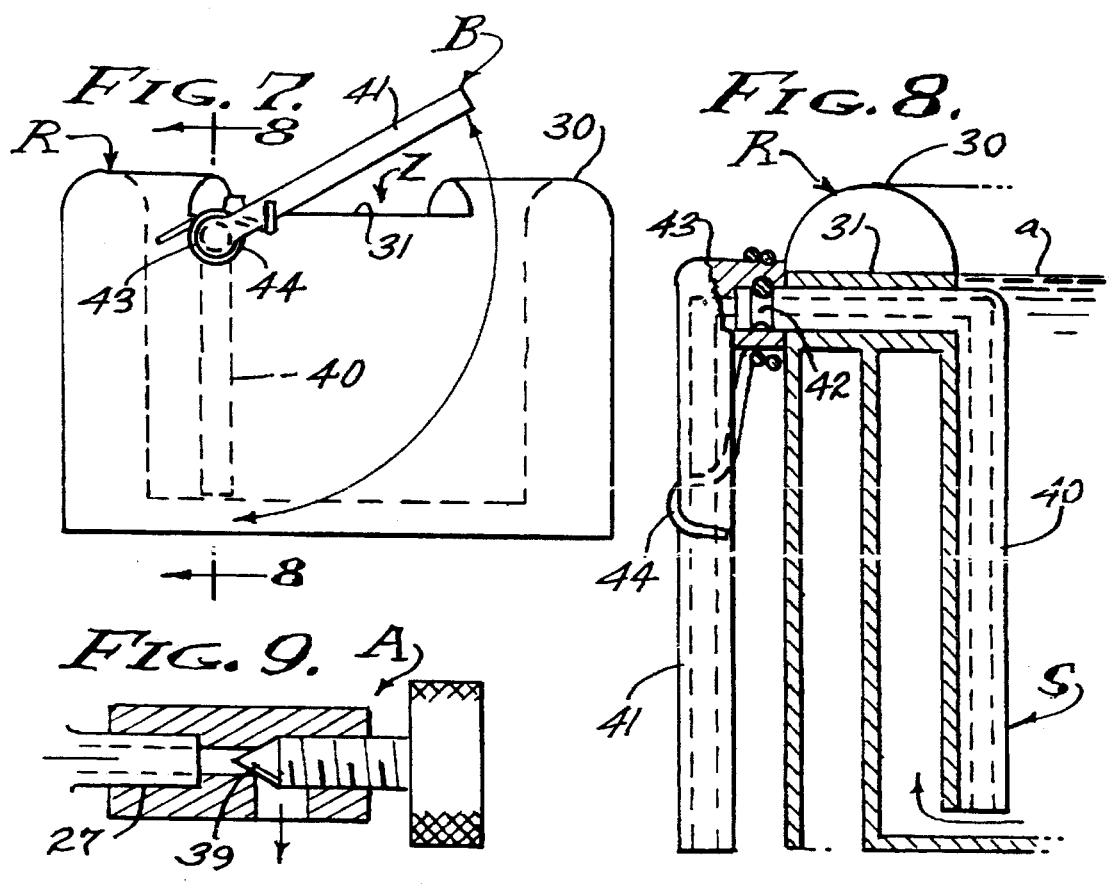

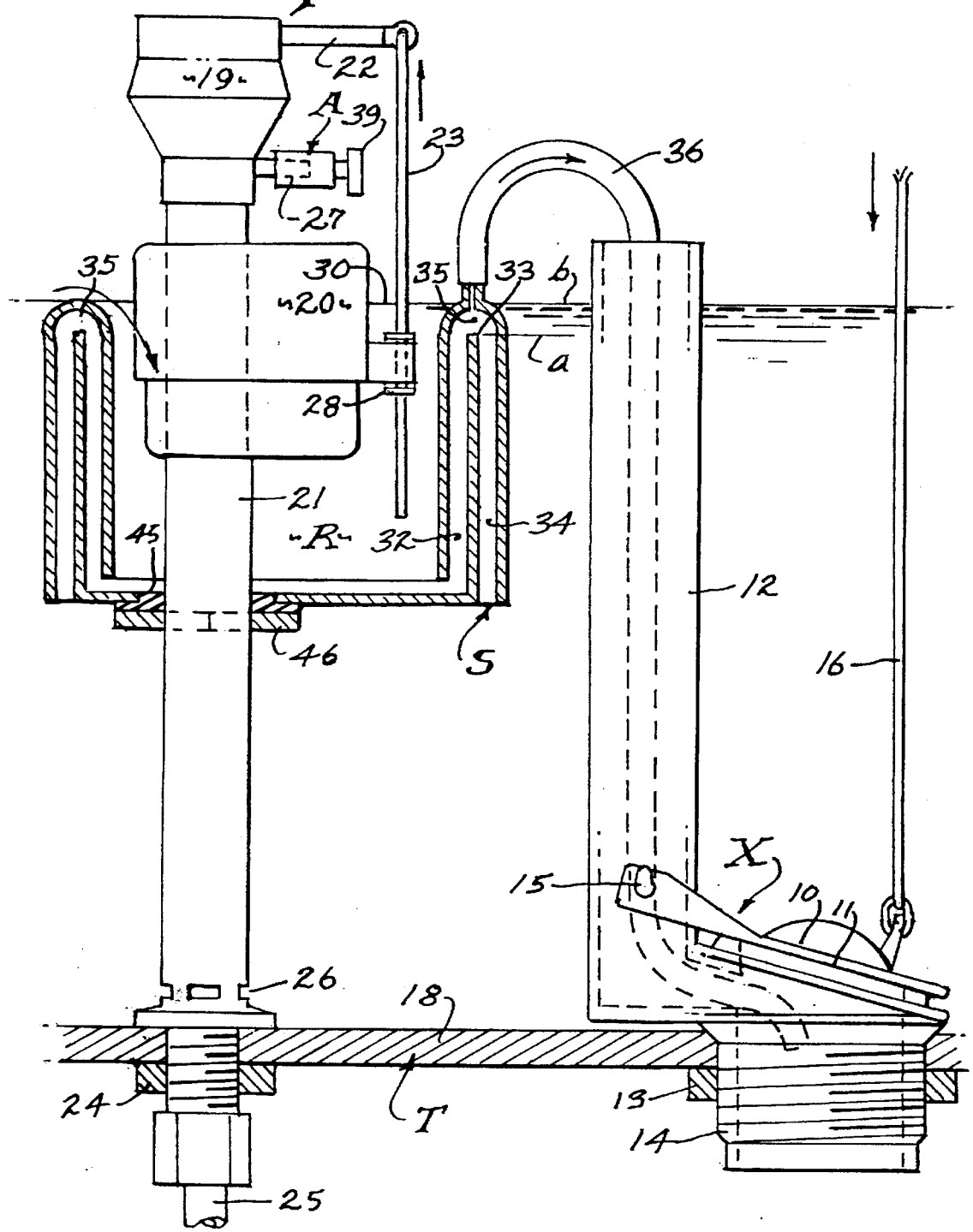

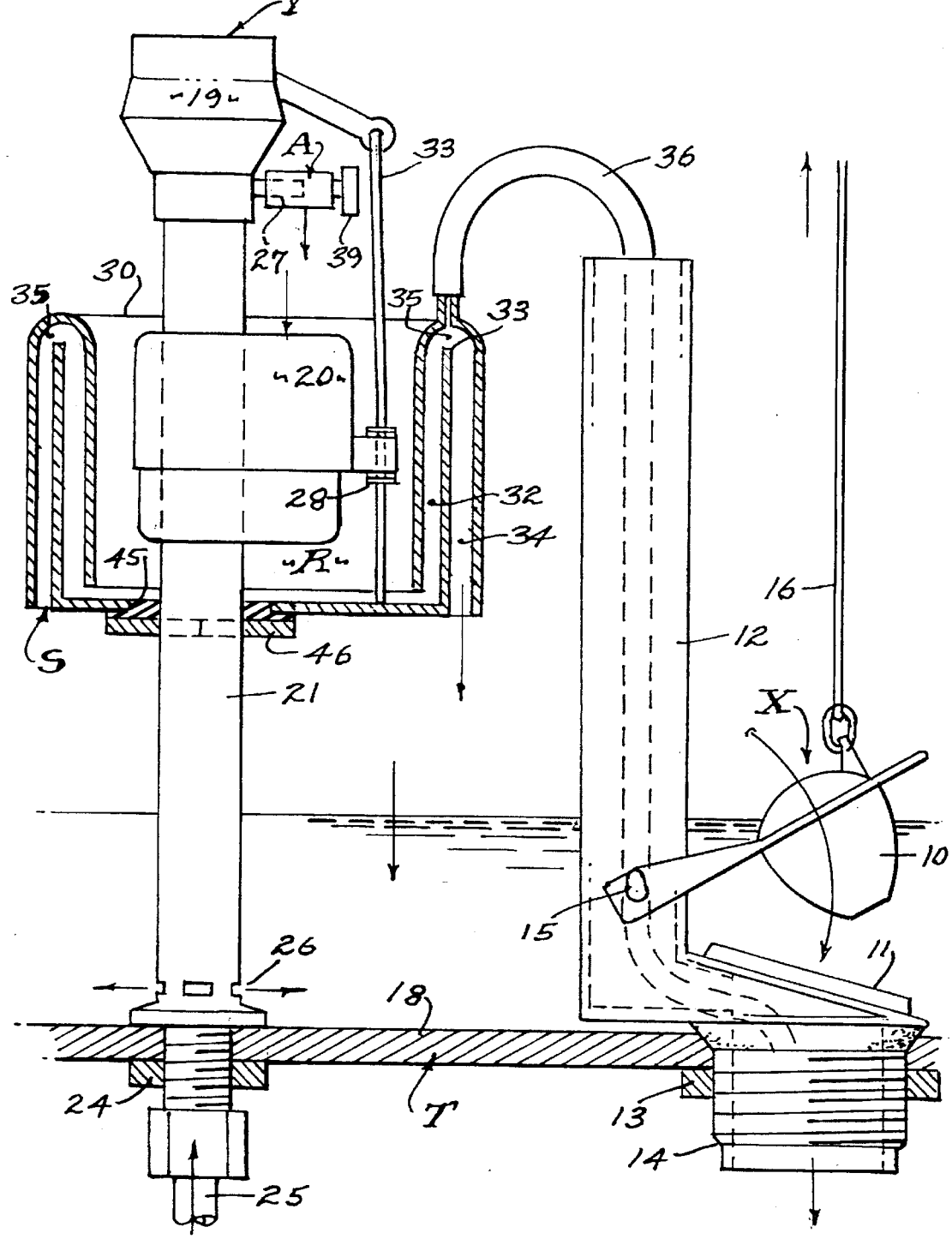

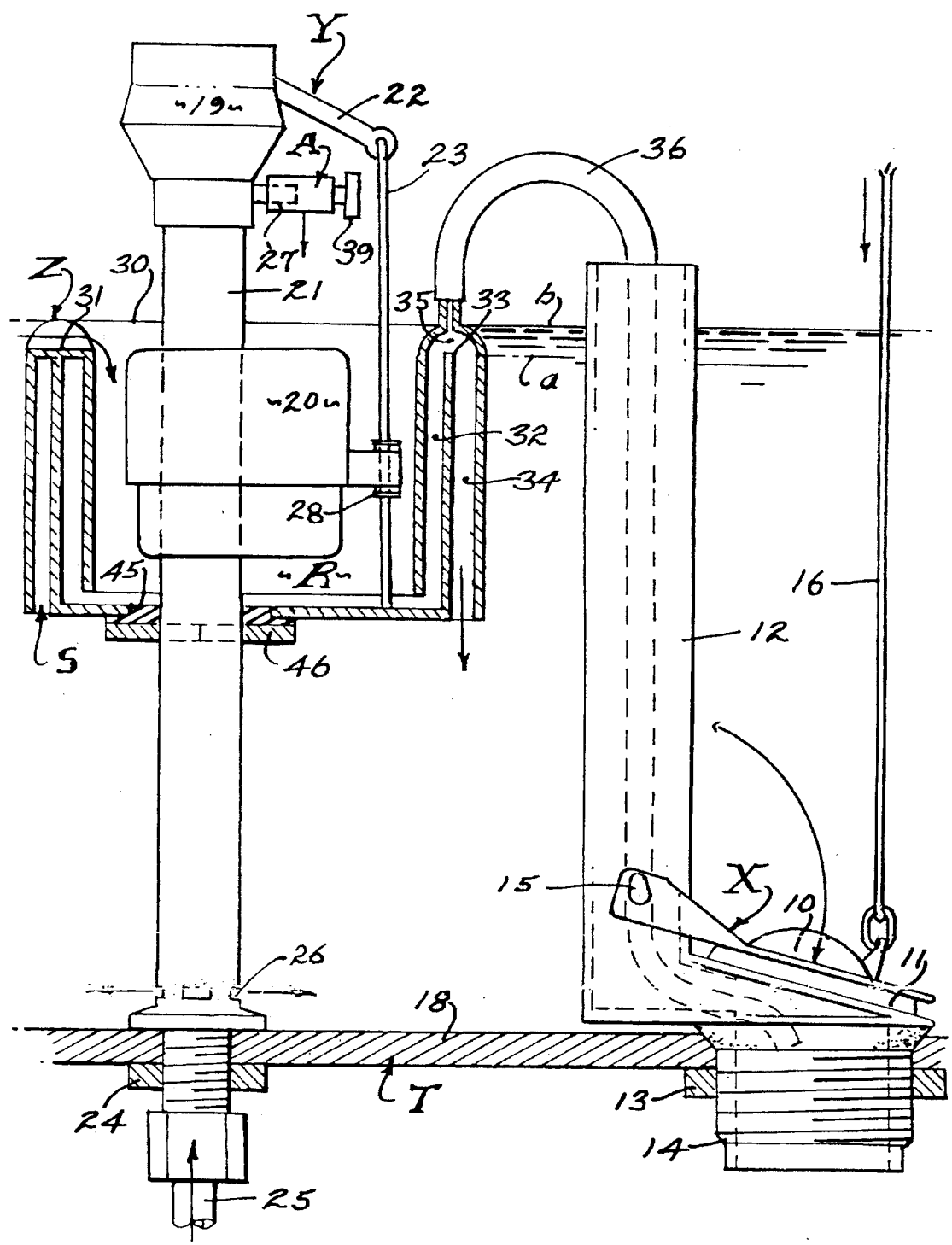

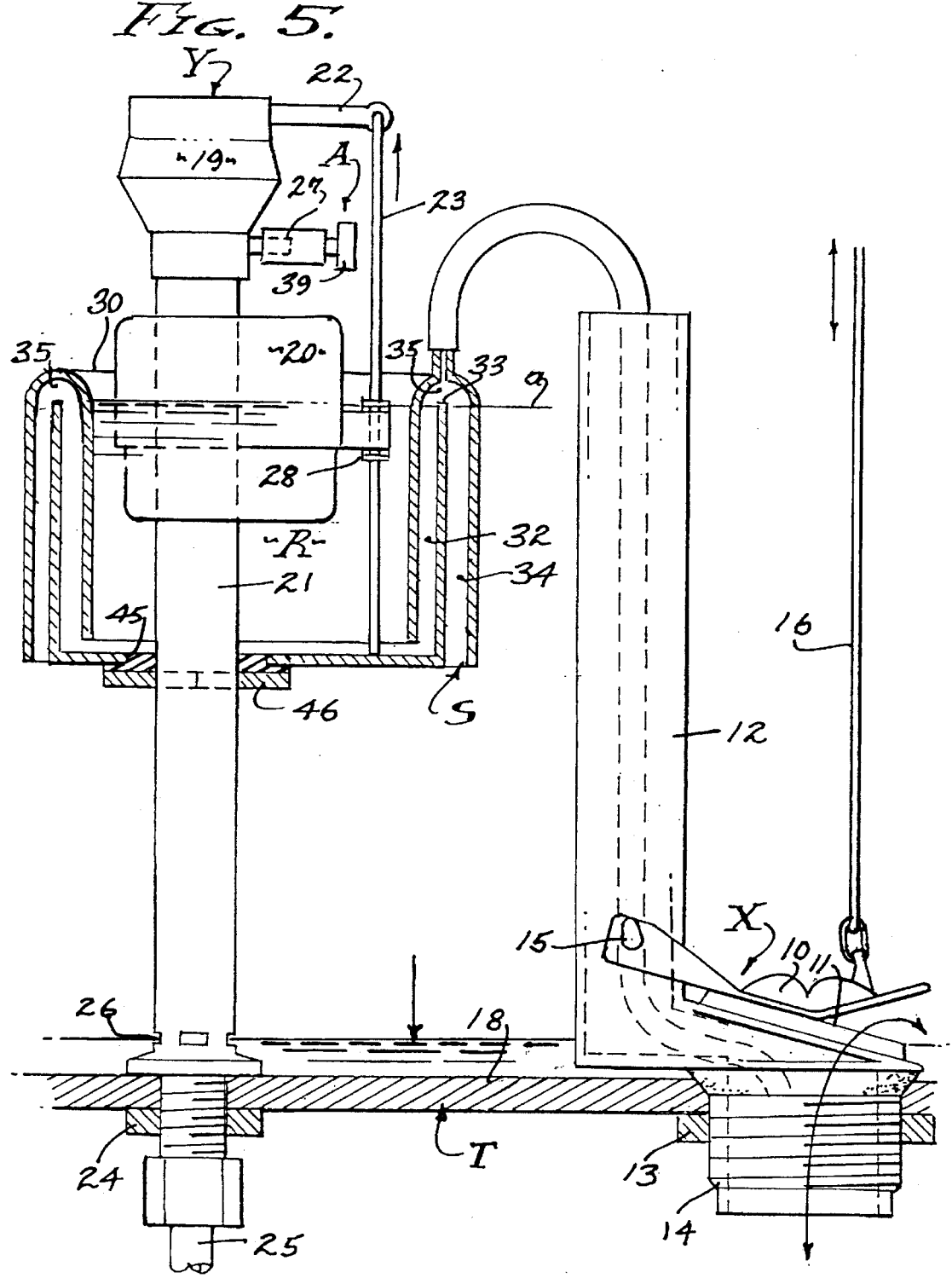

RESERVOIR FILL VALVE CONTROL FOR TOILET STORAGE TANKS

BACKGROUND OF THE INVENTION

This invention relates to a water closet or toilet which is conventional in every respect except for the fill valve control that prevents any continued flow of water from the storage tank. A characteristic feature of this invention is the provision of a reservoir in which the water level responsive fill valve operates independent from the water storage tank water level. Accordingly, a conventional toilet bowl (not shown) supports a conventioanl storage tank equipped with the usual overflow pipe and flush valve unit heretofore referred as the "Douglas valve", and the usual level control means heretofore referred to as the "ball-cock". The level control means restores the storage tank water level after each flushing, and the flush valve releases the stored water at a rapid rate for flushing the toilet bowl. State of the art level control fill valve units and flush valve units are shown herein, it being understood that there is a wide variety of such valves as they are supplied as replaceable units.

It is a general object of this invention to prevent storage tank leakage when the flush valve unit deteriorates and water flow cannot be stopped thereby. However, the fill valve level control means is far more reliable and its failure, if at all, is taken care of by the overflow pipe of the flush valve unit. In practice, deterioration of the flush valve results is gradually increased leakage which lowers the water level in the storage tank, or sudden breakage can occur, and with a conventional installation this wasteful failure is automatically compensated for by the level responsive fill valve unit which continuously discharges water into the storage tank. It is this automatic wasteful compensation that is eliminated by this invention, in that no water can be continuously discharged into and drained from the storage tank. A one-time-only discharge of a full tank of water can occur, this reservoir fill valve control preventing any further drainage from the storage tank which then remains dry until repair is made.

It is an object of this invention to isolate the fill valve from the storage tank and make it responsive to a separate water level that changes according to the normal flushing cycle of the toilet and not affected by a leaking flush valve or flush valve failure that results in an empty storage tank.

It is an object of this invention to provide a control reservoir with a fill means and syphon means whereby 1) storage tank water fills said reservoir so that the fill valve shuts OFF the water supply and maintains a "full" level thereof in both the reservoir and the storage tank; and 2) reservoir water discharges in response to flushing when the storage tank water discharges. In the passive ready-to-flush condition the storage tank and control reservoir have a common water level, the reservoir having been filled by overflow water from the storage tank. In and during the flush condition the drop of the storage tank water level automatically initiates syphoning of water from the control reservoir to lower the water level therein for response by the fill valve to discharge supply water into the storage tank. At the end of the fill condition the high level of storage tank water overflows into the control reservoir to raise the water level therein and shut OFF the fill valve. And, in the event of a leaking storage tank or flush valve failure the control reservoir water level remains high so that the fill valve is shut OFF. A feature is the submerged control reservoir and syphon that is fully primed and dormant when the flushing system is in the passive condition, syphoning of the control reservoir being immediately initiated in response to water level drop in the storage tank during a normal flushing operation.

Another object of this invention is to provide a restart valve for the flushing system. For example, if the storage tank is empty and the control reservoir full, the fill valve will be shut OFF. In order to fill the storage tank in a normal manner, I have provided a syphon that discharges the reservoir so that the fill valve responds to turn ON the water supply to the storage tank. The syphon is an accessible spring biased manually operable tube.

Still another object of this invention is to provide for inherent filling of the control reservoir in the event of a catastrophic failure in the flushing system. For example, the storage tank may be rendered incapable of filling, in which case the fill valve would normally remain open or ON. However, the conventional refill tube of the fill valve is employed to discharge into said control reservoir and is metered to fill the same within a determined short length of time.

SUMMARY OF THE INVENTION

This Reservoir Fill Valve Control implements a flush valve so that continued water waist cannot occur. Any type flush valve can be employed, the only requirements therefor being its capability to be manually opened and then closed when the flushing operation is completed. And, any type fill valve can be employed (Hydraulic, pneumatic, or float controlled), the only requirements being its capability of turning ON when the storage tank water level drops and of shutting OFF when the storage tank water level rises to its normal height limit. In accordance with this invention there is a control reservoir combined with the fill valve, and characterized by fill means that charges said reservoir with storage tank water until the water level is common to both the storage tank and to the reservoir, and by a syphon means that is responsive to a normal flushing operation but which remains passive to a slower leakage of the flush valve. However, in the event of a catastrophic failure of the flush valve or of the storage tank, means is provided to fill the reservoir in a short length of time so as to shut OFF the fill valve. Initial operation or following repair, start or restart of this flushing system is by manual release of water from the control reservoir through operation of a syphon. In practice, the control reservoir and associated means are combined with the fill valve as a unit.

The foregoing and various other objects and features of this invention will be apparent and fully understood from the following detailed description of the typical preferred forms and applications thereof, throughout which description reference is made to the accompanying drawings.

THE DRAWINGS

FIG. 1 is a plan view of a typical storage tank arrangement, illustrating a manually operated flush valve unit, and a fill valve unit combined with the Reservoir Fill Valve Control of the present invention.

FIG. 2 is an enlarged detailed sectional view taken as indicated by line 2—2 on FIG. 1, illustrating the passive condition.

FIG. 3 is a view similar to FIG. 2, illustrating the flush condition.

FIG. 4, is a view similar to FIG. 2, illustrating the fill condition.

FIG. 5 is a view similar to FIG. 2, illustrating the storage tank failure condition.

FIG. 7 is a side view of the reservoir and a restart means in its passive condition.

FIG. 8 is an enlarged view taken as indicated by line 8—8 on FIG. 7. And

FIG. 9 is an enlarged detailed sectional view of the reservoir refill adjuster.

PREFERRED EMBODIMENT

Figure 6:
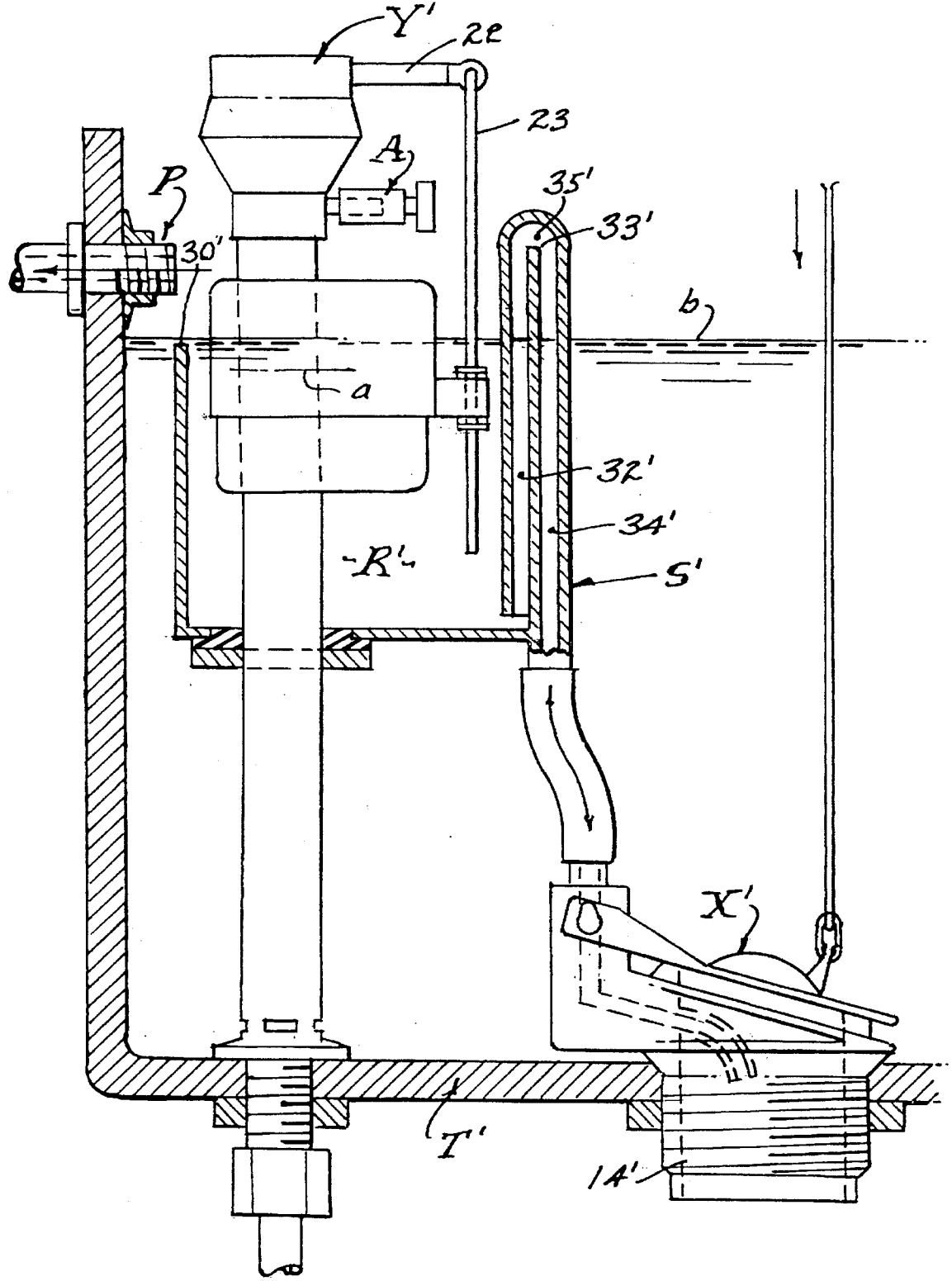
FIG. 6 is a view similar to preceding FIGS. 2–5, illustrating a United Kingdom embodiment of this system.

The toilet under consideration is comprised of a floor mounted toilet bowl (not shown) and a raised water storage tank T. The bowl includes a flush ring and waste trap, and a cover and seat. The storage tank T is supported by the bowl and forms a back, and flushing is by gravity flow of water from the storage tank and through the flush ring and waste trap.

The toilet is made operational by a flush means X and a tank fill valve means Y, which are individually operable to perform their functions. These two valve units are arranged as shown, the flush means X unit being centered in the storage tank T to discharge into the back of the toilet bow, and the tank fill valve means Y unit being offset to one side (left side) and clear of the flush valve.

The flush means X involves a floatable ball or flap valve 10 adapted to be lifted from a seat 11 at the foot of an overflow pipe 12 that extends above a "full" water level in the storage tank T and open to atmosphere below said seat. The foot of the flush means X is sealed to the bottom 18 of the storage tank T and secured by a ring 13 threaded onto a discharge pipe 14. The flap valve 10 is pivoted on the overflow pipe at 15 and is connected by a lift link 16 to a lever 17 that is manually operable from the exterior of the storage tank (see FIG. 1). The flap valve 10 is buoyant and remains open until the storage tank water subsides.

The tank fill valve means Y unit involves a water shut OFF valve 19 actuated by a water level responsive means. As shown herein the water level responsive means is a float 20 freely slidable over a standpipe 21 and connected to a valve actuating lever 22 by means of a push-pull rod 23 so as to shut OFF the water supply when the float 20 is at a control water level a, as later described, and to turn ON the water supply when the float 20 drops in response to a subsiding water level. The foot of the standpipe 21 is sealed to the bottom 18 of the storage tank T and is secured by a nut 24 threaded over a water supply pipe 25. The standpipe 21 is comprised of an inside and an outside tube, whereby supply water flows upwardly to the valve 19 via the inside tube and water is discharged via an annulus to ports 26 at the foot of the standpipe. A refill spigot 27 discharges a restricted flow of water for automatic refill of the control reservoir as later described. The float 20 to lever 22 connection is set by an adjuster 28.

Referring now to the Reservoir Fill Valve Control of the present invention, a control reservoir R and its associated means are combined with the tank fill valve means Y unit, as clearly shown throughout the drawings. A feature of this invention is the alternate communication and isolation of the reservoir water from the storage water, and the two distinctive water levels a and b. Water level a is the supply water shut OFF level, and water level b is the common flood level for filling the control reservoir R and for holding a "full" water level in the storage tank T. It will be observed that the control reservoir R is a small volume upwardly open vessel that accomodates the float 20, and that its brim 30 is at the "full" level b. And in accordance with this invention the control effect of the control reservoir R is implemented by fill valve means Z and syphon means S.

In accordance with this invention a dual purpose inflow-outflow syphon means S permits storage tank T water to flood over an inflow-outflow bridge 33 and into the control reservoir R when the level of storage tank water reaches and exceeds the shut OFF level a. Simultaneously, the reservoir fill mean Z permits storage tank T water to flood over an inflow lip 31 and into the control reservoir R to supplement the syphon inflow over the bridge 33 (see FIGS. 2 and 4). However, it is to be understood that this occurrence does not in itself shut OFF the water supply 25, since the control reservoir R is initially empty after each flushing operation which leaves the float 20 positioned to turn ON the water valve 19. In practice, flooding of the storage tank T raises the water level to the brim 30 and over the lip 31 means Z to then fill the control reservoir, and over the bridge 33 and into the said reservoir. The level of lip 31 and of bridge 33 is slightly above the shut-OFF level a. Inflow into the control reservoir occurs when the storage tank T water level exceeds said level a and reaches toward the flood level b.

The dual purpose inflow-outflow syphon S also discharges the water held in control reservoir R when the toilet flushing operation occurs. The syphon means involves an inside channel 32 from the inside of the control reservoir, joined over the bridge 33 to an outside channel 34 at the exterior of the control reservoir. A feature of this invention is that storage tank water flows through the syphon and into the control reservoir to fill said reservoir. And, another feature is that the control reservoir is submerged in the storage tank water in the "full" passive FIG. 2 ready-to-flush condition, and accordingly the syphon S is primed. The channel 32 opens immediately above the bottom of the control reservoir, and the outside channel 34 opens below said intake and at the bottom of said reservoir.

A feature of this invention is the transfer passage 35 above the bridge 33, that is primed in the passive ready-to-flush condition, and its vent 36 is calibrated to atmosphere. In carrying out this invention, the inside and outside channels 32 and 34 are formed of concentric cylinders joined by a header to establish the intervening transfer pssage 35. The level of the bridge 33 is at or slightly above the shut OFF level a. It is to be observed that the syphon S is dormant when the control reservoir is submerged, and that storage tank and control reservoir water cannot syphon over the bridge 33 under this condition (see FIG. 2). The vent 36 is open to atmoshpere below the flush valve X and is openly exposed to atmosphere in order to permit priming of the transfer passage 35. The vent 36 is restricted to flow and does not adversely affect the syphon S when flushing occurs, being closed in the presence of water.

In the event of a total system failure, such as breaking a flush valve or having it hang open, flood preventer means A is provided for refilling the control reservoir R within a limited time period, so that continued discharge of the flushing system cannot occur. The conventional refill tube or spigot 27 is advantageously employed for this purpose, its discharge being directed into the control reservoir R. A usual fill valve Y refills a storage tank T within 45 or 50 seconds, and the discharge rate of a state of the art refill tube 27 will refill the present control reservoir R within two or three minutes. However, variations in supply water pressure will change the rate of refill water flow, in which case a variable flow control means in the form of a needle valve 39 is provided to shut down the flow from spigot 27 (see FIG. 6). Accordingly, in case of a catastrophic event when flooding occurs, the flood preventer means refills the control reservoir within the limited or adjusted period of time so that the water valve 19 is shut OFF.

In the event of a repair or service situation that leaves the control reservoir in a "full" condition at the level a, restart means B is provided for draining the reservoir to open water valve 19. In its preferred form the means B is a syphon having a fixed intake leg 40 in and extending to the bottom of the control reservoir R, and a discharge leg 41 adapted to be depressed so as to extend below the inlet of leg 40 and open at the exterior of the control reservoir. The suction leg 41 has an uppermost transfer passage that forms a nipple 42 upon which a hub 43 of the leg 41 rotates, and rotatably secured by a pin through said hub to ride in a groove in the nipple. A coil spring 44 surrounds the hub 43 and has an arm anchored into the side of the control reservoir R and a second arm hooked to the leg 41 to raise it against a stop and with its open end above the b and applying closing force to the water valve 19, thereby ensuring its closure.

A commercially available tank fill means Y unit is shown, and to which the control reservoir R and its associated means are retrofitted. The reservoir per se has a bottom opening 45 through which the foot of the standpipe 21 is passed. A split clamp or collar 46 is applied over the standpipe and secured as by means of solvent or adhesive, or by means of fasteners with a gasket (as shown).

Referring now to FIG. 6 of the drawings and to a second embodiment that meets United Kingdom requirements, there is a syphon flush means X' separately operable from a fill means Y' unit. Typical of the United Kingdom toilet flushing systems is the "Warning Pipe" P at a specified level above the level b, whereby leakage into the storage tank T' can be detected by the warning pipe discharge. The control reservoir R' and its associated means including a reservoir fill means Z' are essentially the same as hereinabove described, except as follows: The brim 30' is at the level b with the level of bridge 33' is above the top of the warning pipe P, so that the passage 35 becomes an air pocket 35' that renders the syphon S' dormant. However, when the water level drops in storage tank T' the syphon S' is immediately primed so that the control reservoir R' is quickly emptied. An added feature to the United Kingdom systems is the syphon discharge channel 34' which is downwardly open to atmosphere within the discharge pipe 14' so as to be exposed to the rushing flush water, and thereby to have the jet-pump effect that draws a vacuum on the air pocket 35'. Accordingly, the syphon S' is primed simultaneously with the flushing operation.

SYSTEM OPERATION

The passive ready-to-flush condition of this toilet flushing system is shown in FIG. 2 wherein the storage tank T is filled to level b. The flap valve 10 of the flush means X unit is closed and the overflow pipe 12 is vented to atmosphere. The control reservoir R is submerged in the storage tank water and the brim 30 is coincidental with the level b, the syphon bridge 33 being submerged below said level b. The float 20 rides at the level b which is common to both the storage tank T and to the control reservoir R, thereby applying added closing force to water valve 19. Note particularly that the transfer passage 35 is below level b and vented to atmosphere through the vent 36. Accordingly, the flooded syphon means S is dormant.

The active flush condition of this toilet flush system is shown in FIG. 3 wherein the storage tank T is in the process of discharging through the seat 11 and discharge pipe 14. The flap valve 10 of the flush means X unit is buoyantly held opened by manually lifting it from the seat 11, and tank water is rushing through the discharge pipe 14. The drop of the water level in the storage tank T initiates and is followed by syphoning of water from the control reservoir R. In practice, the syphon means S drains the control reservoir R at approximately the same rate of fall of the water level in the storage tank T, whereby the float 20 drops quickly to turn ON the water valve 19 which immediately commences to refill the storage tank. The flap valve 10 will reseat when the storage tank water drops to the level of seat 11, whereupon the storage tank will be refilled.

The refill condition of this toilet flushing system is shown in FIG. 4 wherein the storage tank T is initially refilled to the shut OFF level a in the reservoir immediately below the level of the bridge 33 of the syphon means S. Note that the reservoir R is empty and that float 20 has remained fully depressed for a fully opened position of the water valve 19. The flap 10 is closed and the vent 36 is restrictively opened to atmosphere, whereby the transfer passage 35 is vented, so as to refill the control reservoir R that is totally drained and the two channels 32 and 34 of the syphon means S dry. Accordingly, the water supply pipe 25 remains open through ports 26 so as to continue refilling the storage tank T above the level a, whereby storage tank water overflows the lip 31 and into the control reservoir R to refill the same and the channels 32 and 34 and transfer passage 35 of the syphon means S. Note that the transfer passage is primed with refill water while the syphon means S is submerged and dormant.

The flush valve failure condition of this toilet flushing system is shown in FIG. 5 wherein a damaged or otherwise ineffective and/or leaking flush valve 10 has permitted depletion of the water level in storage tank T. Depletion can be slow or rapid, and the result of deterioration or mechanical failure. The previously empty control reservoir R has been refilled to level a from the discharge of the refill tube or spigot 27 so as to raise the float 20 to shut OFF the water valve 19. The control reservoir R refills to the shut OFF level a coincidental with the level of bridge 33, whereby an air pocket occurs in the transfer passage that renders the syphon means S dormant. Accordingly, the control reservoir R and its associated means holds the tank fill means Y unit in a passive shut OFF condition so that no water discharge from ports 26 can occur.

A slow to moderate leak of the flush valve will not activate the control reservoir syphon S, because the vent 36 permits the water level to subside in the discharge channel 34 to establish an air pocket that deactivates the syphon. Should the flush valve or storage tank fail totally, the fill means will shut OFF quickly according to the adjusted period of time set by the flood preventer means A. Should the toilet system be out-of-order but capable of flushing, flushing is possible by manually operating the restart means B that empties the control reservoir R. The restart means B is also used after service or repair in order to empty the control reservoir to initiate system operation.

Having described only the preferred forms and applications of my invention, I do not wish to be limited or restricted to the specific details herein set forth, but wish to reserve to myself any modifications or variations that may appear to those skilled in the art as set forth within the limits of the following claims.

I claim:

1. A reservoir fill valve control system for toilet water storage tanks to prevent continued flow of water from a tank fill valve means as as result of a leaking flush valve or storage tank, the fill valve means being actuated by a reservoir water level responsive means to turn the water ON and OFF at a water shut OFF level below a full level of the reservoir water, and including;

a control reservoir and an inflow-outflow syphon means for filling and depleting said reservoir water and with an inflow-outflow bridge at a water shut OFF level below a full level of storage tank water, for filling said reservoir with storage tank water when it exceeds said shut OFF level and for depleting water from said reservoir when toilet flushing occurs, the said water level responsive means being responsive to the control reservoir water level for turning ON the fill valve means in response to depletion of water from the control reservoir and alternately for shutting OFF the fill valve means in response to filling of the control reservoir by inflow of storage tank water over said bridge, the inflow-outflow syphon means having a transfer passage between an inside channel from within the reservoir and over the bridge to an outside channel at the exterior of the reservoir, the bridge level being immediately above the shut OFF level of the control reservoir water, and there being a restricted vent to atmosphere from said passage, whereby the control reservoir water level is raised to and above said shut OFF level to remain in a passive ready-to-flush condition at the storage tank full water level.

2. The reservoir control system for toilet water storage tank fill means as set forth in claim 1, wherein the control reservoir has a brim spaced above the inflow-outflow bridge and at the full level of storage tank water.

3. The reservoir control system for toilet water storage tank fill valve means as set forth in claim 1, wherein a restart means in the form of a syphon with a fixed leg within the control reservoir and a movable leg at the exterior of the reservoir is adapted to be depressed from a passive elevated position to activate the syphon and thereby empty the control reservoir and activate the fill means.

4. The reservoir control system for toilet water storage tank fill means as set forth in claim 1, wherein the control reservoir has a brim spaced above the inflow-outflow bridge and at the full level of storage tank water, and wherein the syphon means has a transfer passage between an inside channel from within the reservoir and over the bridge to an outside channel at the exterior of the reservoir, the bridge level being slightly above the shut OFF level of the control reservoir water.

5. The reservoir control system for toilet water storage tank fill means as set forth in claim 1, wherein the fill valve means includes a fill pipe-spigot directed into the control reservoir and with flood preventer means calibrated to fill the same in a determined time period.

6. The reservoir control system for toilet water storage tank fill means as set forth in claim 1, wherein the restricted vent from the transfer passage opens into a discharge pipe below the said flush valve.

7. The reservoir control system for toilet water storage tank fill means as set forth in claim 1, wherein the fill valve means is actuated by a float responsive to a water level in the control reservoir.

8. The reservoir control system for toilet water storage tank fill means as set forth in claim 1, wherein the fill valve means includes a fill pipe-spigot directed into the control reservoir to fill the same after a flushing operation.

9. The reservoir control system for toilet water storage tank fill means as set forth in claim 1, wherein the control reservoir has a brim spaced above the inflow-outflow bridge and above the full level of storage tank water.

10. The reservoir control system for toilet water storage tank fill means as set forth in claim 9, there being a warning pipe discharge from the storage tank above the full level of storage tank water.

11. The reservoir control system for toilet water storage tank fill means as set forth in claim 10, wherein the control reservoir has a brim spaced above the inflow-outflow, bridge and above the full level of storage tank water, the syphon means opening into a discharge pipe below the said flush valve.

12. The reservoir control system for toilet water storage tank fill means as set forth in claim 11, there being a warning pipe discharge from the storage tank above the full level of storage tank water.

13. The reservoir control system for toilet water storage tank fill means as set forth in claim 1, wherein a restart means for emptying the control reservoir enables the fill valve means to refill the storage tank with supply water.

14. The reservoir control system for toilet water storage tank fill valve means as set forth in claim 13, wherein the restart means is a syphon having a leg shiftable to activate the same.

15. A reservoir fill valve control system for toilet water storage tanks to prevent continued flow of water through a standpipe from a tank fill valve means as a result of a leaking flush valve or storage tank, the fill valve means being actuated by a reservoir water level responsive means to turn the water ON and OFF at a water shut OFF level below a full level of the reservoir water, and including;

a control reservoir carried by the fill valve means and an inflow-outflow syphon means for filling and depleting said reservoir water and with an inflow-outflow bridge at a water shut OFF level below a full level of storage tank water and a brim spaced above said bridge and at the said full level for filling said reservoir when storage tank water exceeds said shut OFF level and for depleting water therefrom when toilet flushing occurs and having a transfer passage between an inside channel from within the reservoir and over the bridge to an outside channel at the exterior of the reservoir, the bridge level being above the shut OFF level of the storage tank water, there being a restricted vent from the passage and opening into a discharge pipe below the said flush valve, the said water level responsive means being responsive to the control reservoir water level for turning ON the fill valve means in response to depletion of water from the control reservoir and alternately for shutting OFF the fill valve means in response to filling of the control reservoir by inflow of storage tank water over said bridge, the inflow-outflow syphon means having a transfer passage between an inside channel from within the reservoir and over the bridge to an outside channel at the exterior of the reservoir, the bridge level being immediatley above the shut OFF level of the control reservoir water, and there being a restricted vent to atmosphere from said passage, whereby the control reservoir water level is raised to and above said shut OFF level to remain in a passive ready-to-flush condition at the storage full water level.

16. A reservoir fill valve control system for toilet water storage tanks to prevent continued flow of water through a warning pipe discharge from a tank fill valve means as a result of a leaking flush valve or storage tank, the fill valve means being actuated by a reservoir water level responsive means to turn the water ON and OFF at a water supply shut OFF level below a full level of the reservoir water, and including;

a control reservoir carried by the fill valve means and with an outflow syphon means having an outflow bridge above a water shut OFF level below a full level of storage tank water, there being a reservoir brim spaced below said bridge and at said full level for filling said reservoir with storage tank water and for depleting water therefrom when toilet flushing occurs, the syphon means having a transfer passage above said full level and between an inside channel from within the reservoir and over the bridge to an outside channel at the exterior of the reservoir, the bridge level being above the full level and immediately above the warning pipe, the outside channel of the syphon means opening into a discharge pipe below the said flush valve to have a jet-pump effect that primes the syphon means when flushing occurs, the said water level responsive means being responsive to the control reservoir water level for turning ON the fill valve means in response to depletion of water from the control reservoir and alternately for shutting OFF the fill valve means in response to filling of the control reservoir by inflow of storage tank water over said bridge, the inflow-outflow syphon means having a transfer passage between an inside channel from within the reservoir and over the bridge to an outside channel at the exterior of the reservoir, the bridge level being immediately above the shut OFF level of the control reservoir water, and there being a restricted vent to atmosphere from said passage, whereby, the control reservoir water level is raised to and above said shut OFF level to remain in a passive ready-to-flush condition at the storage full water level.

* * * * *